United States Patent

[11] 3,600,044

[72] Inventors Walton W. Cushman
Fraser, Mich.;
[21] Appl. No. 846,626
[22] Filed July 7, 1969
[45] Patented Aug. 17, 1971
[73] Assignee Martin Tucker, trustee, New York, N.Y.

[54] ADAPTIVE WHEELED TRACTION DEVICE
19 Claims, 32 Drawing Figs.
[52] U.S. Cl. .................................................. 305/20,
180/9.64, 305/29, 305/33, 305/35 EB
[51] Int. Cl. .................................................. B62d 55/12
[50] Field of Search ........................................ 180/9.64,
9.2; 305/20, 33, 35 EB; 280/28.5

[56] References Cited
UNITED STATES PATENTS
1,450,643 4/1923 Platt .............................. 305/20
1,516,578 11/1924 Platt .............................. 305/20
3,107,924 10/1963 Cushman ....................... 305/20 X 3,050,347 8/1962 Levi ............................ 305/20

Primary Examiner—Richard J. Johnson
Attorney—Clelle W. Upchurch

ABSTRACT: A wheeled traction device has a pair of hubless wheels or rollers for effectively engaging a surface along which the wheels propel the device; a first rotatable wheel or roller placed intermediate of the hubless wheels is operatively connected to such hubless wheels by means of a load belt which also encircles a substantial portion of the periphery of each of the hubless wheels; a rotatable power input member, adapted for connection to a power output shaft of an associated vehicle, is also operatively connected to said belt means and the first intermediate wheel or roller; the first intermediate wheel or roller functions to reverse the effective direction of rotation of the power input member when it is rotated by said vehicle power output shaft thereby causing the hubless wheels to rotate in the same direction as the power input member.

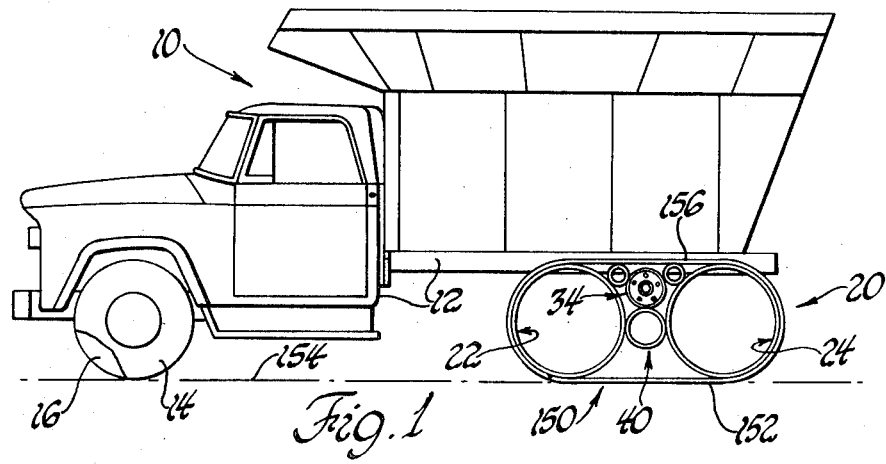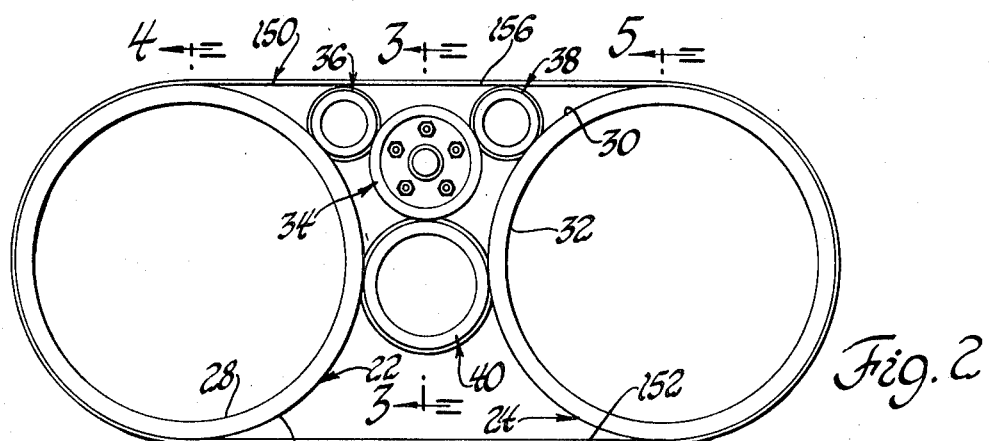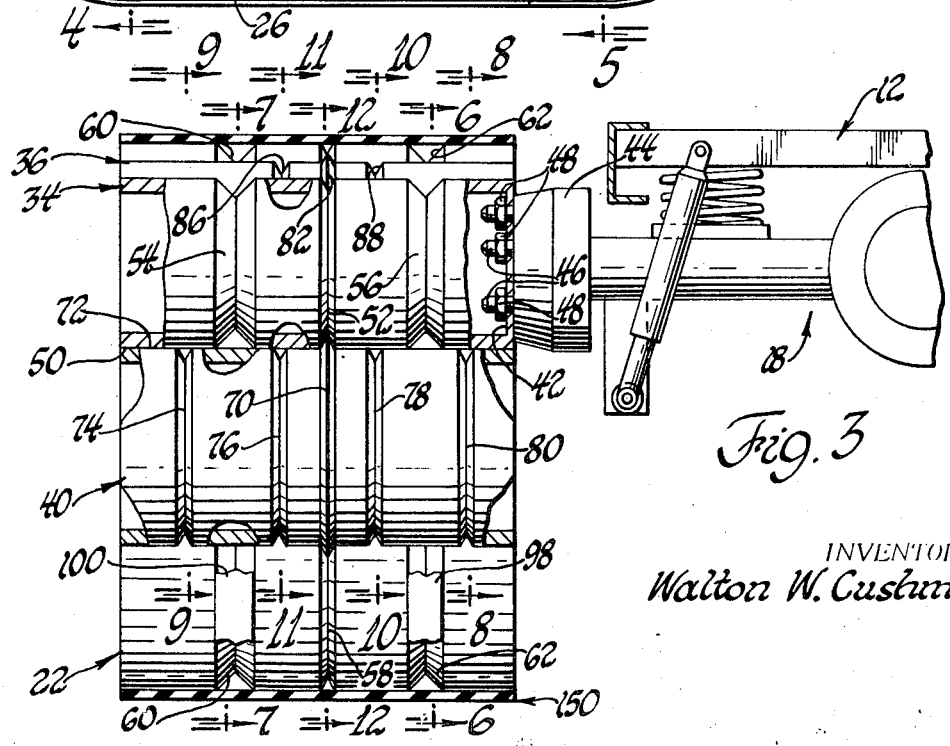

INVENTOR.
Walton W. Cushman

INVENTOR.
Walton W. Cushman

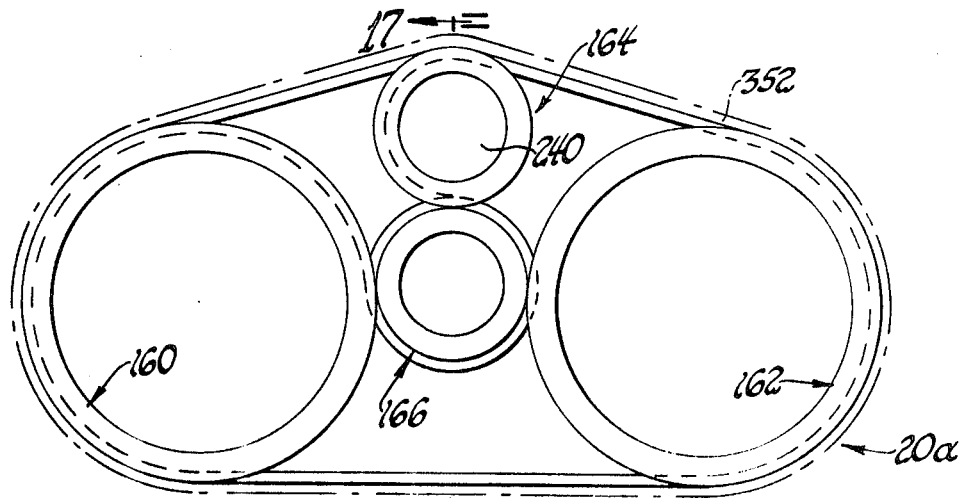
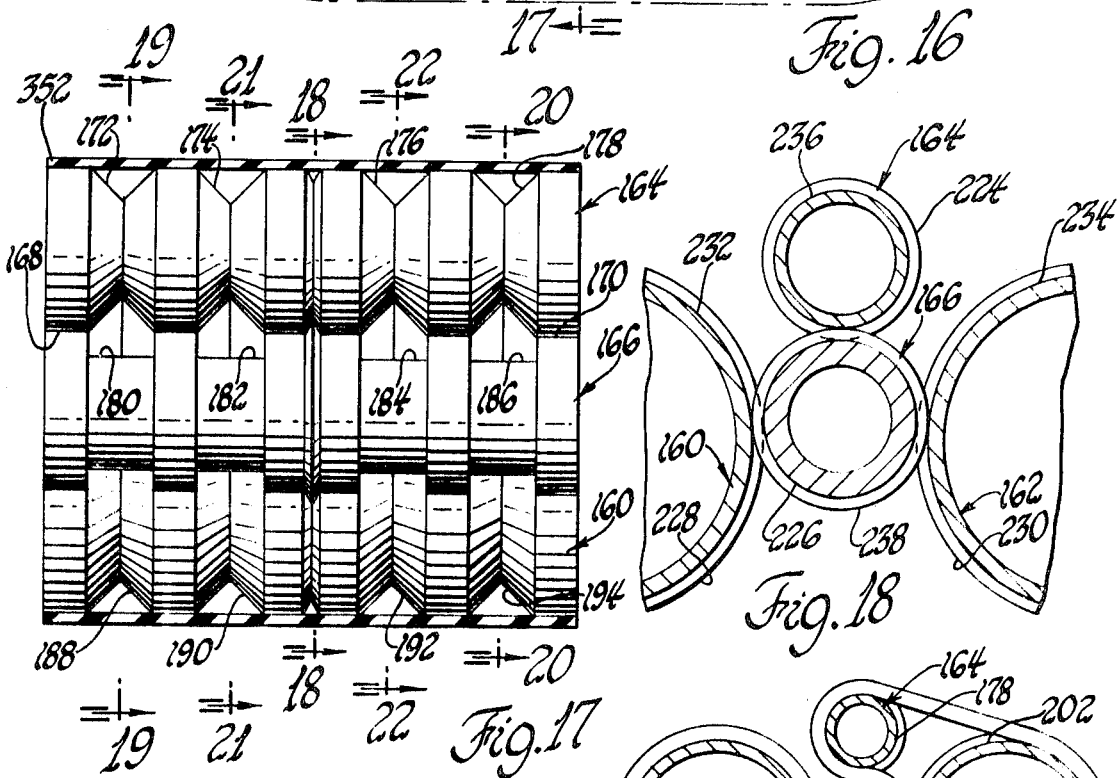
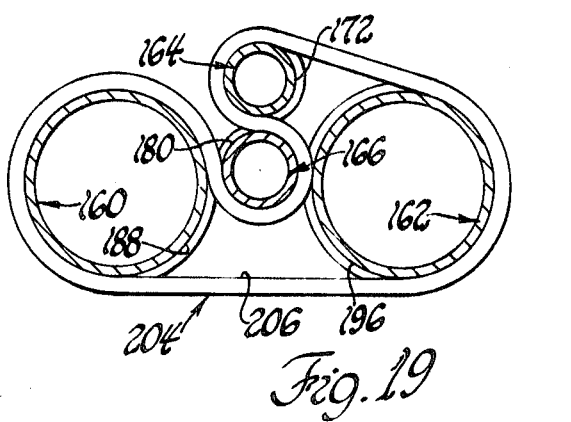
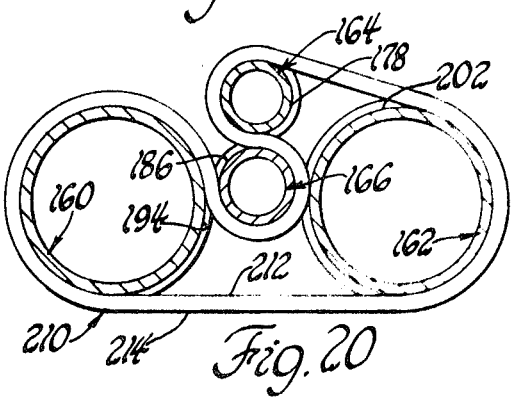

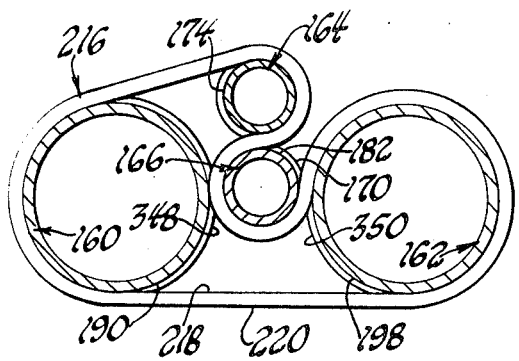

INVENTOR.
Walton W. Cushman

3,600,044

ADAPTIVE WHEELED TRACTION DEVICE

BACKGROUND OF THE INVENTION

Heretofore vehicles, such as trucks, employed in the construction industry as well as, for example, in the road building industry were usually limited to operation on either a road surface or to an off-road terrain. The road-type vehicles were usually provided with relatively small rear-mounted driving wheels while, in comparison the off-road vehicles were usually equipped with relatively large driving wheels on which were mounted large-tread pneumatic tires. Further, the off-road type vehicle, in order to convey heavy loads, is usually geared as to have a very low top forward speed thereby providing the maximum degree of torque to the driving wheels often necessary to move such heavy loads.

Consequently, it has often been found necessary, during the course of construction, to employ both on-road and off-road vehicles because of the inherent limitations in each of such vehicles. That is, the on-road vehicle had neither the wheel size, tire tread, gearing nor sufficient power to enable it to operate effectively in transporting heavy loads over the often rough terrain or off-road conditions, while the off-road type of vehicle could not be employed on surfaced or unsurfaced roads because of its comparatively large size and its exceptionally low top speed.

Accordingly, the invention as herein disclosed and claimed is directly concerned with the solution of the above as well as other problems. That is, the adaptive wheeled traction device of the invention, as will be seen, enables the rapid conversion of, for example, an on-road type vehicle to one which can be employed for off-road use thereby often eliminating the need of two different types of vehicles.

SUMMARY OF THE INVENTION

According to the invention, an adaptive-wheeled traction device comprises an integrated load-suspension and surface locomotion apparatus including a hubless wheel assembly, means circumferentially loading said assembly, a rotatable power input member adapted for driving connection to a power supplying shaft of an associated vehicle, and reversing idler means operatively engaging said rotatable power input member and said hubless wheel assembly, said idler means being effective for causing rotation of said hubless wheel assembly in the same direction as the rotation of said rotatable power input member.

Accordingly, a general object of this invention is to provide an adaptive wheeled traction device as above which can be, after removal of the conventional wheel and tire, quickly affixed and secured to the axle drive wheel of a truck drive axle thereby providing such vehicle with an integrated suspension and drive locomotion apparatus which in turn provides a large foot pring or tread area for engaging the ground surface.

Another object of the invention is to provide an adaptive wheeled traction device as set forth in the above general object wherein said locomotion apparatus enables, by virtue of said large foot print or tread area, the vehicle to transverse over rough off-road terrain.

A further object of the invention is to provide an adaptive wheeled traction device as set forth above wherein means are provided for automatically causing in effect a reversal of the direction of rotation of the vehicular drive axle in order to cause the wheeled traction device to have a direction of movement consistent with the vehicle operator's normal selection of gear engagement in the vehicular power transmission assembly.

Other more specific objects and advantages of the invention will become apparent when reference is made to the following detailed description considered in conjunction with the accompanying drawings.

DESCRIPTION OF THE DRAWINGS

In the drawings, wherein, for purposes of clarity, certain elements may be omitted from one or more views:

FIG. 1 is a side elevational view of a conventional vehicle equipped with an adaptive wheeled traction device constructed in accordance with the teachings of this invention;

FIG. 2 is an enlarged side elevational view of the wheeled traction device of FIG. 1;

FIG. 3 is a further enlarged cross-sectional view taken generally on the plane of line 3–3 of FIG. 2 and looking in the direction of the arrows, with certain portions thereof shown in elevation for greater clarity;

FIG. 16 is a side elevational view, similar to FIG. 2, illustrating a second embodiment of the invention;

FIG. 17 is a cross-sectional view taken generally on the plane of line 17–17 of FIG. 16 with certain portions thereof shown in elevation for purposes of clarity;

FIG. 18 is a fragmentary cross-sectional view taken generally on the plane of line 18–18 of FIG. 17 and looking in the direction of the arrows;

FIGS. 19, 20, 21 and 22 are each reduced cross-sectional views respectively taken on the planes of lines 19–19, 20–20, 21–21, and 22–22 of FIG. 17;

FIGS. 23 and 24 are each enlarged fragmentary cross-sectional views respectively taken on the planes of lines 23–23 and 24–24 of FIG. 22;

FIG. 25 is an enlarged axial cross-sectional view (similar to FIG. 17) taken on the plane of line 25–25 of FIG. 28 and looking in the direction of the arrows with certain portions thereof shown in elevation for purposes of clarity;

FIGS. 26, 27, 28, 29, 30 and 31 are each reduced cross-sectional views respectively taken on the planes of lines 26–26, 27–27, 28–28, 29–29, 30–30 and 31–31 of FIG. 25.

DESCRIPTION OF THE PREFERRED EMBODIMENTS

Figure 4:
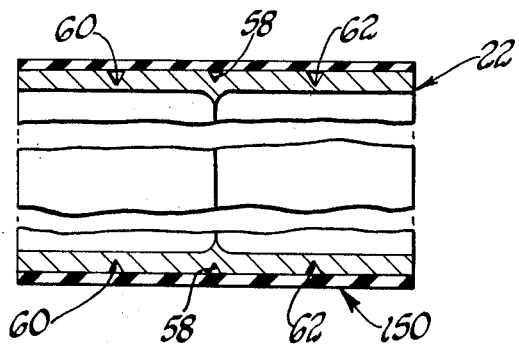
FIGS. 4 and 5 are similar cross-sectional views respectively taken generally on the planes of lines 4–4 and 5–5 of FIG. 2 and looking in the direction of the arrows.

Referring now in greater detail to the drawings, FIG. 1, by way of example, illustrates a high load capacity truck 10 having a body and frame 12 with forwardly disposed ground engaging steering wheels 14 and 16 and a rear driving axle assembly a portion of which is illustrated in enlarged scale at 18 of FIG. 3. The adaptive wheeled traction device 20 of the invention is shown mounted to the drive axle assembly 18 thereby having a general side elevational view as shown in FIG. 1 when thusly operatively secured to the truck 10.

As better seen in both FIGS. 2 and 3, the adaptive wheeled traction device 20 is illustrated as being comprised of first and second surface driving wheels 22 and 24 which, as shown, may be of a hollow or hubless configuration. (By hubless it is of course meant that the operation of the load carrying capabilities of the wheels 22 and 24 is not dependent upon the existence of a centrally disposed axle, functioning as a hub about which the wheel revolves, within each of such wheels 22 and 24.) Although the invention can be practiced by employing various materials for the formation or fabrication of the surface driving wheels 22 and 24, it is nevertheless contemplated that in the preferred construction, driving wheels 22 and 24 would be machined, cast or otherwise formed from a tough, wear resistant semirigid elastomer. It should also be apparent that the wall thickness of the wheels, that the distance between the outer diameter 26 and inner diameter 28 of wheel 22 as well as the distance between outer diameter 30 and inner diameter 32 of wheel 24 can be varied to any suitable desired dimension and, if desired, such wheels 22 and 24 may actually be completely filled so as to have a solid cross section.

In any event, a rotatable power input member 34 is situated generally between the surface driving wheels 22 and 24 and retained in such position by virtue of being nested between a group of three rollerlike motion transmitting members 36, 38 and 40 and a coacting system of continuous belts. The power input member 34 is illustrated as being of a cylindrical or rollerlike configuration having a closed end portion or wall 42 forming a mounting plate which is secured against the axle drive wheel 44 as by means of the conventional mounting lugs or studs 46, carried by the axle drive wheel 44, passing through cooperating apertures formed in the end plate 42. The power input roller 34 is tightly secured onto the studs 46 by means of respective nuts 48. As illustrated, it is contemplated that the power input roller 34 could be formed of a suitable semirigid elastomer such as, for example, an elastomer from the class polyurethane materials. However, this is not to say that other materials as, for example, aluminum, could not be employed.

As best seen in FIG. 3, the outer cylindrical surface 50 of roller 34 is provided with a generally medially situated guide groove 52 formed therein and circumferentially thereabout. Additionally main load belt grooves 54 and 56 are also formed in roller 34, circumferentially thereabout, and spaced from each other on opposite sides of guide groove 52 so as to be respectively between the guide groove 52 and the ends of the roller 34.

Figure 5:
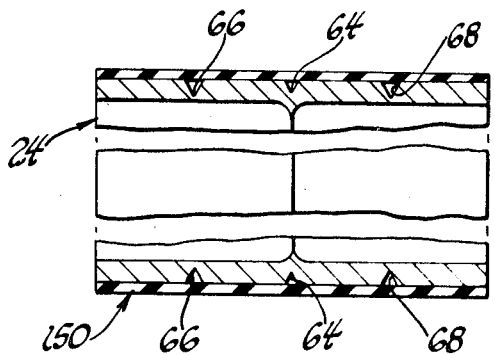

As also seen in FIGS. 3, 4 and 5, each of the surface driving wheels 22 and 24 is provided with a circumferentially guide grove and a plurality of main load belt grooves. For example, as seen in FIGS. 3 and 4, surface driving wheel 22 has formed therein a guide groove 58 and main load belt grooves 60 and 62 while, as shown in FIG. 5, surface driving wheel 24 has formed therein a medially situated guide groove 64 and spaced main load belt grooves 66 and 68. With the surface driving wheels 22 and 24 in assembled relationship as shown in FIG. 3, main load belt grooves 60, 54 and 66 are held in a generally common plane passing therethrough while main load belt grooves 62, 56 and 68 are held in a second spaced generally common plane passing therethrough.

As shown in FIG. 3, the lower reverse roller 40 (reverse, in the sense that it rotates in a direction reverse of that direction of rotation of the power input member 34 and axle wheel 44) is provided with a medially disposed circumferentially extending guide flange 70 extending radially outwardly of the outer diameter 72 of roller 40. As the outer diameter of reverse roller 40 is held in rolling contact with power input member 34 and surface drive wheels 22 and 24, the guide flange 70 is adapted to be rollingly received within and confined by the guide grooves 58 and 64 of surface drive wheels 22 and 24, respectively, and guide groove 52 of power input roller 34. In addition to the guide flange 70, the lower reverse roller member 40 is also provided with a plurality of grooves 74, 76, 78 and 80 formed circumferentially thereabout. As shown, grooves 74 and 76 are formed on one side of flange 70 while grooves 78 and 80 are formed on the opposite side thereof. From an inspection of FIG. 3, it can be seen that circumferential grooves 76 and 78 (on opposite sides of flange 70) are each formed so as to be spaced from flange 70 about one quarter of the total distance between the flange 70 and the respective ends of the roller 40 while circumferential grooves 74 and 80 are spaced inwardly from the ends of the roller 40 about one-quarter of that same total distance. Consequently it can be seen that none of grooves 74, 76, 78 or 80 are in the same general plane passing through either of the main load belts grooves 60, 62, 54, 56, 66 or 68.

As shown in both FIGS. 2 and 3, the invention also provides upper situated reverse-type rollers or driving members 36 and 38. As fragmentarily illustrated in elevation in FIG. 3 the left (as viewed in FIG. 2) upper reverse roller 36 is provided with a medially disposed circumferentially extending guide flange 82 extending radially outwardly of the outer diameter 84 of roller 36. As the outer diameter of upper left reverse roller 36 is held in rolling contact against the outer diameter 26 of surface drive wheel 22 and the outer diameter 50 of the main load or power input roller 34, the guide flange 82 is adapted to be rollingly received within and confined by the guide grooves 58 and 52 of surface drive wheel 22 and main load roller or hub 34, respectively.

In addition to the guide flange 82, the upper left reverse roller or idler 36 is also provided with a plurality of grooves 86 and 88 formed circumferentially thereabout. As shown, grooves 86 and 88 are formed on opposite sides of guide flange 82 and spaced therefrom so as to be in alignment with and respectively contained in a first plane passing through circumferential groove 76 of roller 40 and a second spaced plane passing through circumferential groove 78, also of roller 40.

The upper right reverse idler roller 38 is similarly provided with a medially disposed circumferentially extending guide flange 90 extending radially outwardly of the outer diameter 92 of roller 38. As the outer diameter of reverse idler-type roller 38 is held in rolling contact against the outer diameter 30 of surface drive wheel 24 and the outer diameter 50 of the main load hub 34, the guide flange 90 is adapted to be rollingly received within and confined by the guide grooves 64 and 52 of surface drive wheel 24 and main power input roller or hub 34, respectively.

In addition to the guide flange 90, the upper right reverse roller 38 is also provided with a plurality of grooves 94 and 96 formed circumferentially thereabout. However, such grooves 94 and 96 are not in alignment with grooves 86 and 88 of left roller-idler 36 when such rollers 36 and 38 are in assembled relationship as shown by FIG. 2, but rather are in respective alignment with spaced circumferential grooves 74 and 80 of the lower roller 40.

As is evident, the various belt arrangements have not been shown in FIG. 3 since the inclusion of such therein would only tend to obscure the disclosure. For this purpose FIGS. 6, 7, 8, 9, 10, 11, and 12 (some of which are fragmentary cross-sectional views) have been provided which, it is believed, better illustrate the various belts employed.

Figure 6:
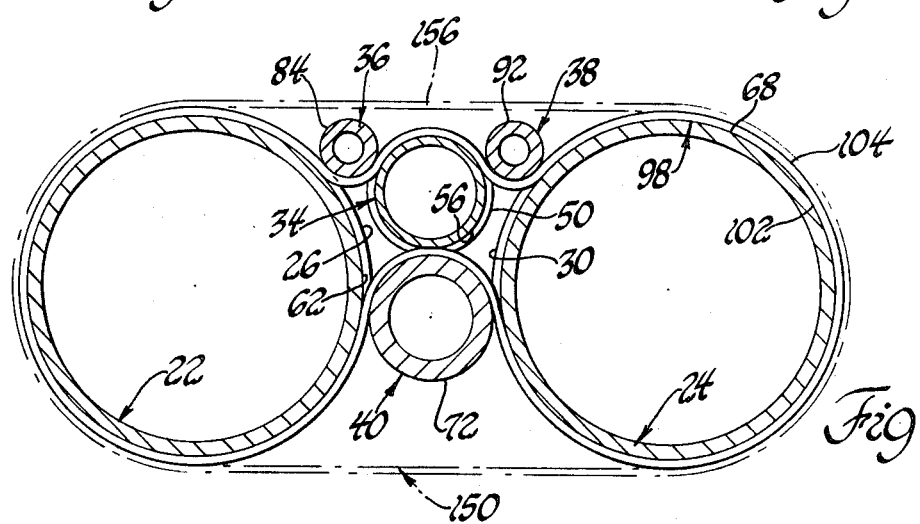
FIG. 6 is a cross-sectional view taken on the plane of line 6–6 of FIG. 3.

For example, as shown in FIG. 6, a first continuous or endless main load belt 98 is placed upon surface drive wheels 22 and 24 so as to be situated within the respective circumferential main load belt grooves 62 and 68. The innermost side 102 of the load belt 98 is held against such grooves while the outermost side 104 of the load belt 98 is first passed under and held against the outer diameter 92 of idler roller 38. The belt 98 then continues by passing over the main power input hub or roller 34 in a manner so as to have the inner side 102 of the belt held within the circumferential groove 56 of the main hub 34. Next, the belt 98 passes under the upper left idler roller 36 in a manner whereby the upper side 104 thereof is held against the outer diameter 84 of the roller 36.

The endless belt 98 then continues about surface drive wheel 22, within circumferential groove 62, and passes over the top of lower idler roller 40 by having its outermost surface 104 in contact with the outer diameter 72 of the roller 40. It should be noted that at this point the innermost side 102 of belt 98 is accommodated by the same circumferential groove 56 formed in main load hub or roller 34. Such accommodation permits the continued rolling contact between the outer diameters 50 and 72 of main load hub 34 and lower idler roller 40, respectively.

The endless load belt 98 then continues from lower idler 40 onto the surface drive wheel 24 by having its innermost side 102 accepted within the circumferential load belt groove 68 formed therein.

It should be mentioned that even though FIG. 6 is a view taken on the plane of line 6-6 of FIG. 3 which passes through the medial portion of the coacting grooves and belt, the belt 98 has been shown in elevation rather than cross-hatched in the belief that this would more clearly illustrate the coaction of the various elements. The same also applies to FIGS. 7, 8, 9, 10 and 11.

In view of the above, it can be seen that if, in FIG. 6, counterclockwise rotation of the main power input roller 34 is assumed, upper idler rollers 36 and 38 will each be rotated clockwise, surface drive wheels 22 and 24 will each be rotated counterclockwise and lower idler roller 40 will be rotated clockwise. This, of course, results in the overall apparatus moving to the left as viewed in either of FIGS. 1, 2 or 6.

Figure 7:
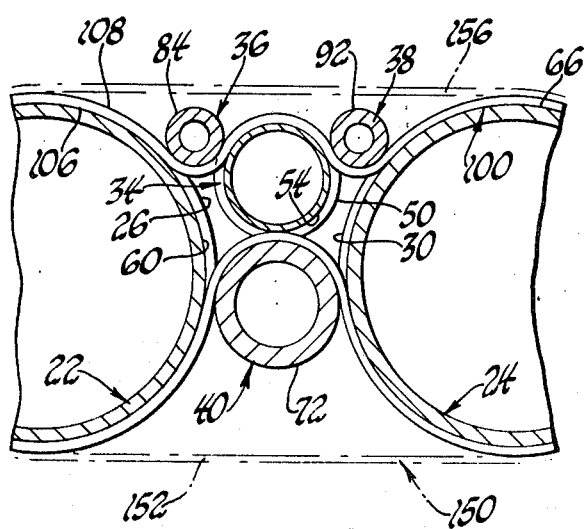
FIGS. 7, 8, 9, 10, 11 and 12 are each fragmentary cross-sectional views respectively taken on the planes of lines 7–7, 8–8, 9–9, 10–10, 11–11 and 12–12 of FIG. 3 and looking in the direction of the arrows.

FIG. 7, a fragmentary cross-sectional view taken generally on the plane of line 7-7 of FIG. 3, illustrates the placement of the second main load belt 100. The innermost side 106 and the outermost side 108 of endless belt 100 are passed around and between the various roller elements and the surface drive wheels 22 and 24 in the same general manner as the first main load belt 98, previously described, except that main load belt 100 is received in and follows the second set of load belt grooves comprised of circumferential grooves 60 and 66 of surface drive wheels 22 and 24, respectively, and circumferential groove 54 of the main load hub or roller 34. The respective directions of rotation as discussed with reference to FIG. 6 apply equally well to the arrangement of FIG. 7.

FIGS. 6 and 7 illustrate the manner of application and the path of travel of the load main belts 98 and 100; however, from an inspection of such Figures it can be seen that inherently the main load belts 98 and 100 do not prevent the main load hub or roller 34 and the lower reaction roller 40 from, in effect, falling or moving downwardly from the respective positions shown. This is accomplished, in this embodiment, by a separate set of snubbing or tensioning type belts which are separately illustrated in FIGS. 8, 9, 10 and 11.

Figure 8:
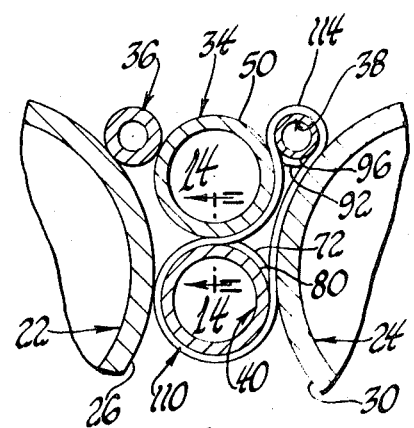

FIG. 8, a fragmentary cross-sectional view taken generally on the plane of line 8-8 of FIG. 3, illustrates a first snubbing type endless belt 110 received generally about and within the circumferentially extending belt groove 96 formed in idler roller 38. As will be noted the innermost side 112 of belt 110 is received within groove 96. The belt 110 is passed generally between the main load hub 34 and surface driving wheel 24 and looped about the lower idler reaction roller 40 in a manner so as to have the innermost side 112 thereof received within the circumferential belt groove 80 formed in reaction roller 40. In so doing, it will be noted that the outermost side 114 of belt 110 engages the outer diameter 50 of the main power input or load hub 34 in generally the lower right quadrant thereof. Further, the outermost side 114 of belt 110 also engages the outer diameter 30 of surface driving wheel 24 along an arcuate sector thereof included between a first line joining the centers of hub 34 and wheel 24 and a second line joining the centers of reaction roller 40 and wheel 24. Such contact established by the outermost side 114 of belt 110 serves to further provide tractive force from the main power input roller 34 to the surface drive wheel 24.

Figure 9:
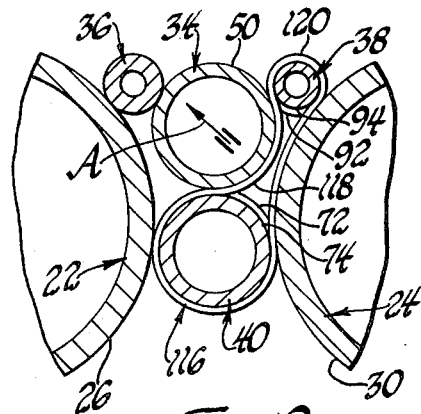

FIG. 9, a fragmentary cross-sectional view taken generally on the plane of line 9-9 of FIG. 3, illustrates the placement of a second snubbing type endless belt 116. The innermost side 118 and the outermost side 120 of belt 116 are passed around and between the various roller elements and the surface drive wheel 24 in the same general manner as the first snubbing belt 110, previously described, except that the second snubbing belt 116 is received in and follows a second set of snubbing belt grooves comprised of circumferential grooves 94 and 74 respectively formed in upper idler roller 38 and lower reaction roller 40.

From a comparison of FIGS. 8 and 9 with FIG. 6, it can be seen that the previously established rotational relationships are valid with respect to the belts, rollers and wheel 24 of FIGS. 8 and 9. For example, counterclockwise rotation of main load hub 34 will correspondingly cause clockwise rotation of idler roller 38, clockwise rotation of lower idler-reaction roller 40 and, of course, counterclockwise rotation of the surface drive wheel 24.

Figure 10:
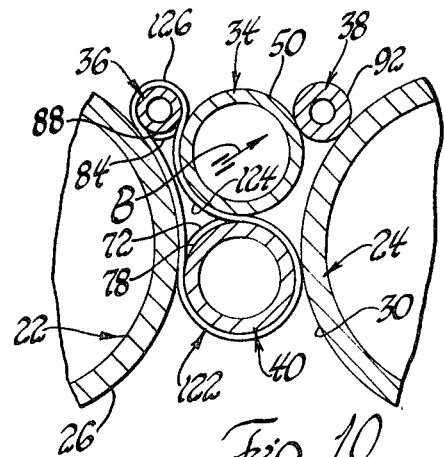

FIG. 10, a fragmentary cross-sectional view taken generally on the plane of line 10-10 of FIG. 3, illustrates a third snubbing type endless belt 122 received generally about and within the circumferential belt groove 88 formed in upper left idler roller 36. As will be noted, the innermost side 124 of belt 122 is received within groove 88. The belt 122 is passed generally between the main load hub 34 and surface driving wheel 22 and looped about the lower idler reaction roller 40 in a manner so as to have the innermost side 124 thereof received within the circumferential belt groove 78 formed in lower reaction roller 40. In so doing, it will be noted that the outermost side 126 of belt 122 engages the outer diameter 50 of the main power input or load hub 34 in generally the lower left quadrant thereof. Further, the outermost side 126 of belt 122 also engages the outer diameter 26 of surface driving wheel 22 along an arcuate sector thereof included between a first line joining the centers of hub 34 and wheel 22 and a second line joining the centers of reaction roller 40 and wheel 22. Such contact established by the outermost side 126 of belt 122 serves to further provide for the transmission of tractive force from the main power input roller 34 to the surface drive wheel 22.

Figure 11:
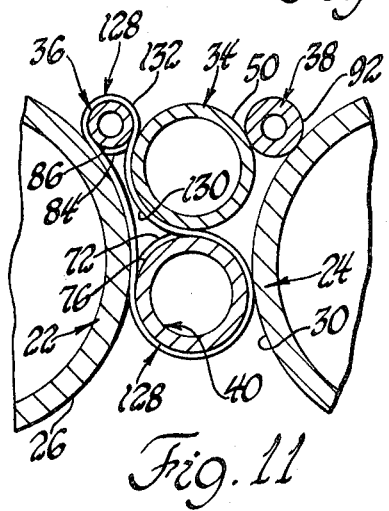

FIG. 11, a fragmentary cross-sectional view taken generally on the plane of line 11-11 of FIG. 3, illustrates the placement of a fourth snubbing type endless belt 128. The innermost side 130 and the outermost side 132 of belt 128 are passed around and between the various roller elements and the surface drive wheel 22 in the same general manner as the third snubbing belt 122, previously described, except that the fourth snubbing belt 128 is received in and follows a fourth set of snubbing belt grooves comprised of circumferential grooves 86 and 76 respectively formed in upper left reaction roller 36 and lower reaction roller 40.

As with FIGS. 8 and 9, it can be seen, by a comparison of FIGS. 10 and 11 with FIG. 6, that the previously established rotational relationships are valid with respect to the belts, rollers and wheel 22 of FIGS. 10 and 11. For example, counterclockwise rotation of main load hub 34 will correspondingly cause clockwise rotation of idler roller 36, clockwise rotation of lower idler-reaction roller 40 and, of course, counterclockwise rotation of the surface drive wheel 22.

Figure 12:
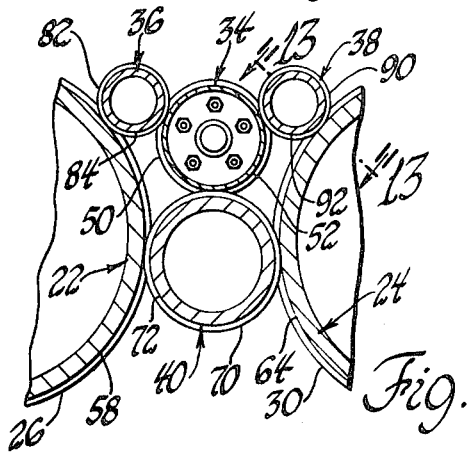

FIG. 12, a fragmentary cross-sectional view taken generally on the plane of line 12-12 of FIG. 3, illustrates the cooperative relationship existing between the various guide or tracking grooves and flanges as the wheels 22 and 24 and the several rollers rotate with respect to each other. For example, as upper idler rollers 36 and 38 rotate on their respective outer diameters 84 and 92 against the outer diameters 26 and 30 of surface drive wheels 22 and 24 the respective circumferential guide or tracking flanges 82 and 90 are generally rollingly received within cooperating circumferential guide or tracking grooves 58 and 64 formed in surface drive wheels 22 and 24. Simultaneously, the rollers 36 and 38 are in rolling contact at their outer diameters 84 and 92 against the outer diameter 50 of the main power input roller or hub 34. Consequently, the same tracking flanges 82 and 90 are generally rollingly received within the medially disposed circumferential tracking groove 52 formed in the main power input or load hub 34.

Finally, the lower reaction or reversing roller 40, which is also in rolling contact at its outer diameter 72 against the outer diameters 26 and 30 of wheels 22 and 24 as well as against the outer diameter 50 of the power input roller 34, has its circumferential tracking flange 70 generally rollingly received within the tracking grooves 58 and 64 of wheels 22 and 24 as well as the tracking groove 52 of the main power input roller member 34.

In view of the above it can be seen that the various cooperating circumferential grooves and flanges remain in a generally common plane, while the respective elements are experiencing rolling action, thereby preventing the various elements from being accidentally axially displaced with respect to each other and maintaining such elements in a proper tracking relationship.

Figure 13:
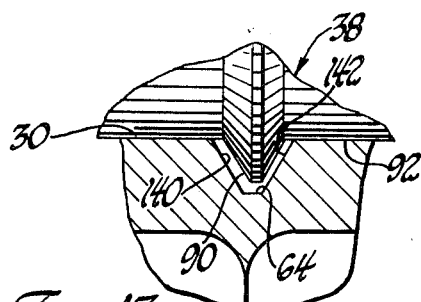
FIG. 13 is a fragmentary enlarged typical cross-sectional view taken generally on the plane of line 13–13 of FIG. 12.

FIG. 13 is an enlarged fragmentary cross-sectional view, taken generally on the plane of line 13–13 of FIG. 12, illustrating the preferred relationship between the circumferential tracking flange 90, of idler 38, and the tracking groove 64 of surface driving wheel 24. As can be seen, preferably the cross section configuration of groove 64 is such as to have the sidewalls 140 and 142 somewhat loosely confine the flange 90 therebetween. This enables the cooperating rolling elements to experience substantial but nevertheless limited relative angularity. The arrangement of FIG. 13 is, of course, typical of all such cooperating tracking grooves and flanges employed within the device 20.

Such an arrangement of grooves and flanges, of course, provides a self-tracking feature to the device 20 which enables each of the wheels 22 and 24 to react independently when negotiating obstacles in their path of travel. The relative flexibility of the various belts and the loosely confined tracking flanges enables the hubless surface driving wheels 22 and 24 to be displaced in a manner wherein their respective centerlines or axes assume a nonparallel or even skewed relationship in all directions, as well as with reference to the idler rollers and power input roller, without any loss of rolling integrity.

The invention as thus far described discloses a wheeled traction device which employs one or more main load belts 98, 100 which are situated about and in engagement with a plurality of driving wheels 22, 24 and a power input member 34. The load belt or belts 98, 100, as shown in FIGS. 6 and 7 almost totally circumscribe the driving wheels 22 and 24 thereby providing for an exceptionally large area for driving contact therebetween.

Further, as can be seen from FIGS. 8 and 9, the spaced tensioned snubbing or confining belts 110 and 116 create a first reaction force against the power input roller 34, in a direction illustrated generally by arrow A in FIG. 9, passing through the axis of the hub 34. An opposite reaction is also caused against wheel 24 which also passes through the axis thereof. Similarly, belts 122 and 128 of FIGS. 10 and 11 create a second reaction force against the power input roller 34, in a direction illustrated generally by arrow B in FIG. 10, passing through the axis of the hub 34. Of course, an opposite reaction is caused against wheel 22 which also passes through the axis thereof.

As a consequence of such forces depicted by arrows A and B, power input roller 34 is maintained generally medially between the idler or reaction rollers 36 and 38 and thereby situated atop the lower idler or reaction roller 40. Any tendency of input roller 34 to move to the right, as viewed in either FIGS. 8 or 9, would tend to cause the upper reaction idler roller 38 to move generally upwardly. However, such a tendency on the part of idler 38 would result in an immediate increase in the tension of reaction belts 110 and 116 which increase would prevent the upward displacement of idler 38 and maintain the power input roller 34 medially disposed. The same results would, of course, be obtained if the power input roller 34 had a tendency to move to the left, as viewed in either FIGS. 10 or 11. In such case the reaction snubbing belts 122 and 128 would also experience an increase in the tensioning thereof and cause power input roller 34 to remain medially disposed.

It should also be noted that the pairs of oppositely disposed belts 110, 116 and 122, 128 also serve to tension the main load belt or belts 98 and 100. For example, since belts 110, 116 and 122, 128 are in tension they tend to cause idler rollers 36 and 38 to move downwardly toward the lower reaction roller 40. However, such motion is precluded by the fact that the main load belts 98 and 100 are positioned as to pass under the rollers 36 and 38 while, in turn, passing over the top of primary input roller 34. Accordingly, such a tendency for downward movement of idler rollers 36 and 38 attributed to the tensioned confining belts 110, 116 and 122, 128 serves to only further tension the main load belts 98 and 100.

At the same time it can be seen that since upper idler rollers 36 and 38 are yieldingly confined from downward movement, the lower idler or reaction roller 40 has a tendency to move upwardly. However, such upward motion is precluded, again, by the fact that the main load belts 98 and 100 are passed over the top of primary input roller 34 and lower reversing roller 40. That is, it can be seen that such a tendency for upward movement of lower reaction roller 40 attributed to the tensioned confining belts 110, 116 and 122, 128 serves only to urge the load belts, situated atop the rollers 34 and 40, upwardly to further tension the main load belts 98 and 100.

In view of the preceding it can be seen that the invention provides an arrangement wherein a rotatable primary power input member is somewhat yieldingly caged within a system of rotatable idler type power transmitting members which thereby serve to maintain the power input member in a specified position relative to the overall traction system.

Figure 14:
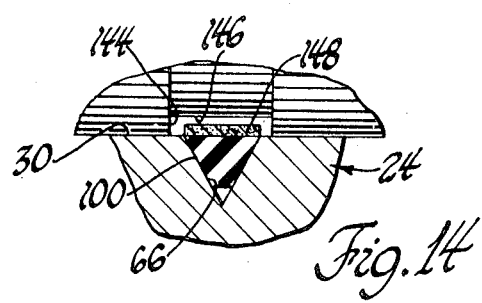
FIG. 14 is an enlarged fragmentary cross-sectional view of a contemplated modification in the belt groove arrangement which could be taken on the plane of line 14–14 of FIG. 7.

Depending upon the structure and composition of the hubless wheels 22 and 24, and the loads supported, a wide range of design flexibility is inherently provided so that the apparatus 20 constitutes a combined load bearing suspension and surface locomotion system. If desired, the load belt-engaging surfaces of the various elements as well as the wheels 22 and 24 may be hardened or otherwise formed or treated for wear of the elements or the particular material employed; it should be apparent that the device 20 is constructed so as to permit the employment of a broad variety of materials, depending upon the application intended. To this extent is should be mentioned that load belts 98 and 100 as well as the constraining belts 110, 116, and 122, 128 may be of a suitable elastomer and may, if desired, be reinforced. Further, it is conceivable that a continuous or endless link-type belt could be employed in the formation of a load belt. Further, as typically illustrated in FIG. 14, clearance type circumferential grooves could be formed in the cooperating roller elements as, for example, in idler wheel 38 in order to freely accommodate the back side of the V-belt main load belt 100. The clearance groove 144 could be formed so as to have a reduced diameter 146 which would clear the outer side 108 of belt 100. This would be done in the case wherein the belt 100 might have an outer reinforcing fabric portion 148 and wherein the groove 66 of surface wheel 24 is of a size causing the outer side 108 of belt 100 to be radially outwardly of the outer diameter 30.

As also illustrated in FIGS. 1 through 7, in the preferred embodiment of the traction device 20, a suitable continuous tread belt 150 is provided and looped about the drive wheels 22 and 24 so as to have a lower run 152 engaging the ground surface 154 and an upper run portion 156 passing freely over the idlers 36, 38 and power input member 34. The precise configuration or the specific material forming the tread belt forms no part of this invention since the practice of this invention is in no way limited to the use of a particular type of belt.

Figure 15:
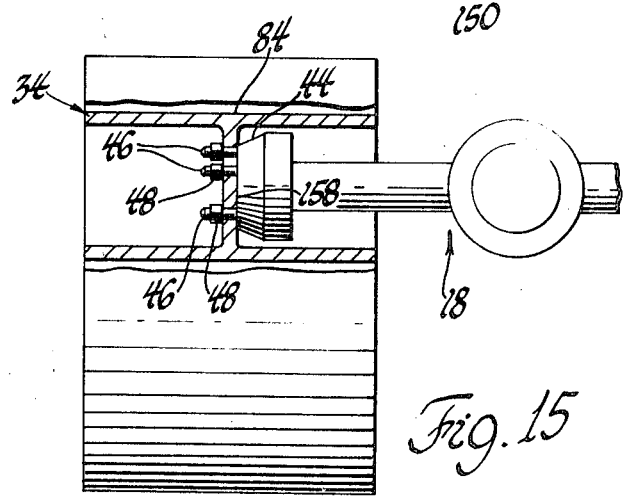
FIG. 15 is an elevational view, with portions thereof broken away and in cross section, illustrating a modification of the mounting arrangement of FIG. 3.

FIG. 15 illustrates another modified arrangement for securing the primary power input roller 34 to the drive axle assembly 18. In this arrangement the axle drive wheel 44 would be secured to a wall portion 158 formed inwardly from the ends of the roller 34 (possibly medially thereof). As a consequence thereof the loading characteristics of the roller 34 are improved by a better distribution of the downward force presented by the axle assembly 18.

FIGS. 16 through 23 illustrate a second embodiment of the invention. Basically, as illustrated in FIG. 16, the wheeled tractive device 20a is comprised of surface drive wheels 160, 162, which may be hubless and made of the same material as wheels 22 and 24, a rotatable primary input member 164 and a reversing load applying member 166. As illustrated in FIG. 17 each of the rotatable members 164 and 166 is of generally hollow cylindrical form held in rolling contact against each other as on their respective outer diameters 168 and 170.

The primary input roller or hub 164 is provided with a plurality of spaced circumferentially extending grooves 172, 174, 176 and 178 which, as shown are situated as to be generally symmetrically about the medial portion of the roller 164. Likewise, reversing reaction roller 166 has formed therein a plurality of circumferentially extending grooves 180, 182, 184 and 186 which, as shown, are so located as to be respectively in running alignment with grooves 172, 174, 176 and 178 when rollers 164 and 166 are held in their assembled condition. Similarly, surface drive wheel 160 has formed therein a plurality of circumferentially extending grooves 188, 190, 192 and 194 which are also respectively in running alignment with grooves 172, 174, 176 and 178 when assembled as shown. The second drive wheel 162 is also provided with circumferentially extending grooves 196, 198, 200 and 202 located so as to be in respective running alignment with grooves 188, 190, 192 and 194.

As best illustrated by FIGS. 19, 20, 21 and 22, a system of belts, functioning as both main load belts and reaction belts, is employed for conveying rotative driving power to the surface driving wheels 160 and 162 as well as maintaining the power input roller 164 and reverse reaction 166 in the position illustrated.

For example, as shown in FIG. 19, a first continuous or endless load belt 204 is placed upon surface drive wheels 160 and 162 so as to be situated within the respective circumferential main load belt grooves 188 and 196. The innermost side 206 of belt 204 is held against such grooves while the outermost side 208 of belt 204 is first passed under reaction roller 166 and held or received within the groove 180 formed therein. Belt 204 then continues about reaction roller 166 to an upper portion thereof where the belt is received within groove 172 of primary power input roller 164. The belt 204 continues to be wrapped about input roller 164, within groove 172, from where it tangentially emerges and continues on to the groove 196 of wheel 162 thereby completing its loop through the system.

Even though FIG. 19 is a view taken on the plane of line 19-19 of FIG. 17 which passes through the medial portion of the coacting grooves and belt, the belt 204 has been shown in elevation rather than cross-hatched in the belief that this would more clearly illustrate the coaction of the various elements. The same applies to FIGS. 20, 21 and 22.

In view of the above, it can be seen that if, in FIG. 19, counterclockwise rotation of the main power input roller 164 is assumed, lower reaction roller 166 will be rotated clockwise while drive wheels 160 and 162 will each rotate counterclockwise driving the device to the left, as viewed in FIG. 19.

FIG. 20, a cross-sectional view taken generally on the plane of line 20-20 of FIG. 17, illustrates the placement of a second load belt 210. The innermost side 212 and the outermost side 214 of endless load belt 210 are passed around and between the roller elements and the surface drive wheels 160, 162 in the same general manner as the first main load belt 204, previously described, except that the main load belt 210 is received in and follows the second set of belt grooves comprised of circumferential grooves 194 and 202 of drive wheels 160 and 162, respectively, groove 186 of reaction roller 166 and groove 178 of main power input roller 164. The respective directions of rotation as discussed with reference to FIG. 19 apply equally well to the arrangement of FIG. 20.

FIGS. 19 and 20 illustrate the manner of application and path of travel of the load belts 204 and 210; however, from an inspection of such Figures it can be seen that inherently the load belts 204 and 210 do not prevent the main load hub or roller 164 from, in effect, falling or moving rightwardly and downwardly from its illustrated position generally atop the reaction roller 166. The prevention thereof is accomplished, in this embodiment by a separate set of load belts which are separately illustrated in FIGS. 21 and 22.

FIG. 21, a cross-sectional view taken generally on the plane of line 21-21 of FIG. 17, illustrates a third load belt 216 placed upon surface drive wheels 160 and 162 so as to be situated within the respective circumferential main load belt grooves 190 and 198. The innermost side 218 belt 216 is held against such grooves while the outermost side 220 of belt 216 is first passed under reaction roller 166 and held or received within the groove 182 formed therein. Belt 216 then continues generally around the left side of reaction roller 166 to an upper portion thereof where the belt is then received within groove 174 of primary power input roller 164 in a manner so as to pass generally around the right side thereof. The belt 216 continues to be wrapped about input roller 164, within groove 174, from where it tangentially emerges and continues on to the groove 190 of wheel 160 thereby completing its loop through the system.

FIG. 22, a cross-sectional view taken generally on the plane of line 22-22 of FIG. 17, illustrates the placement of a fourth continuous load belt 222. The innermost side 224 and the outermost side 226 of belt 222 are passed around and between the roller elements and surface drive wheels 160, 162 in the same general manner as the third load belt 216, previously described, except that the main load belt 222 is received in and follows the fourth set of belt grooves comprised of circumferential grooves 192 and 200 of drive wheels 160 and 162, respectively, groove 184 of reaction roller 166 and groove 176 of main power input roller 166. The respective directions of rotation as discussed with reference to FIG. 19 again apply equally well to the arrangement of both FIGS. 21 and 22.

In comparing FIGS. 19, 20 to FIGS. 21, 22 it can be seen that load belts 216 and 222 provide a restrictive force, against the power input roller 164, which is in opposition to that restrictive force developed by belts 204 and 210 of FIGS. 19 and 20. Accordingly, by virtue of such balanced oppositely directed restrictive forces, the power input roller 164 is maintained substantially in the position illustrated while simultaneously maintaining rolling driving contact with the reaction roller 166. Consequently, as shown in FIG. 18, the disclosed system of belts enables the outer diameter 224 of power input roller 164 to be held in rolling contact with the outer diameter 226 of reaction roller 166. Simultaneously, the belts further enable a rolling contact to be achieved as between the outer diameter 226 of reaction roller 166 and the outer diameters 228 and 230 of drive wheels 160 and 162, respectively.

In addition to the belts and grooves, the device 20a is provided with a self-tracking feature for the same purposes as disclosed with reference to the embodiment of FIG. 2.

FIG. 18, a fragmentary cross-sectional view taken generally on the plane of line 18-18 of FIG. 17, illustrates the self-tracking arrangement as being comprised of a plurality of circumferentially extending, tracking grooves 232, 234 and 236 respectively formed in drive wheels 160, 162 and power input roller 164 and a cooperating circumferentially extending tracking flange 238 formed on reaction roller 166 and directed radially outwardly beyond the outer diameter 226 thereof. As shown in FIG. 17, each of said tracking grooves and said tracking flange are located so as to be medially disposed between the ends of the respective elements.

FIG. 23, a typical enlarged fragmentary cross section taken on the plane of line 23-23 of FIG. 22, illustrates one acceptable manner of containing the load belts within the cooperating grooves. Similarly, FIG. 24, also a typical enlarged fragmentary cross-sectional view taken on the plane of line 24-24 of FIG. 22, illustrates another acceptable manner of containing the outermost side of the belts within the cooperating grooves in the lower reaction roller 166.

As with the embodiment of FIG. 1, the device 20a of FIG. 16 may also be operatively connected to the drive axle of a related vehicle by virtue of an end type mounting plate or wall 240 (similar to either wall 42 or 158) carried by the main hub 164.

Further, as shown in FIGS. 16 and 17, the device 20a may be provided with an endless tread belt 242 which is situated as to be looped about drive wheels 160, 162 and power input member 164.

FIGS. 25 through 32 illustrate a third embodiment of the invention. As illustrated, the wheeled traction device 20b is comprised of surface drive wheels 244, 246, which may be hubless and made of the same material as wheels 22 and 24, a rotatable primary input member 248 and a reversing load or idlerlike member 250. As illustrated in FIG. 25, each of the rotatable members 248 and 250 is of generally hollow cylindrical form held in rolling contact against each other as on their respective outer diameters.

The primary input roller or hub 248 is provided with a plurality of spaced circumferentially extending grooves 252, 254, 256, 258, 260 and 262 which, as shown, are situated as to be generally symmetrical about the medial portion of the roller 248. Likewise, reversing reaction roller 250 has formed therein a plurality of circumferentially extending grooves 264, 266, 268 270, 272 and 274 which, as shown, are so located as to be in running alignment with grooves 252, 254, 256, 258, 260 and 262 when rollers 248 and 250 are held in their assembled condition. Similarly, surface drive wheel 244 has formed therein a plurality of circumferentially extending grooves 276, 278, 280, 282, 284 and 286 while surface drive wheel 246 is provided with circumferential grooves 288, 290, 292, 294, 296 and 298. Such grooves within the drive wheels 244 and 246 are also in respective running alignment with the grooves of power input member 248 and reverse idler 250. As will become evident, various belt systems are employed for conveying the load and power to the driving wheels as well as maintain the cooperating elements in the positions shown.

Figure 26:
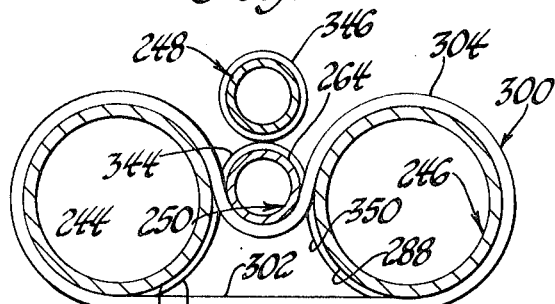

For example, as shown in FIG. 26 a first endless main load belt 300 is placed upon surface drive wheels 244 and 246 so as to be situated within the respective circumferential grooves 276 and 288. The innermost side 302 of the load belt 300 is held against such grooves while the outermost side 304 of the upper run portion of the belt is generally wrapped around the under side of reverse idler or reaction roller 250 so as to be received within the circumferential groove 264 formed therein. From FIG. 26 it can be seen that if counterclockwise rotation of power input member 248 is assumed, idler 250 (which is in rolling contact with input member 248 and driving wheels 244 and 246) will rotate clockwise while drive wheels 244 and 246 will rotate counterclockwise thereby causing the apparatus 20b to propel itself to the left. Similarly, a second endless tread belt 306 is placed upon surface drive wheels 244 and 246 so as to be situated within the respective circumferential grooves 286 and 298.

Figure 27:
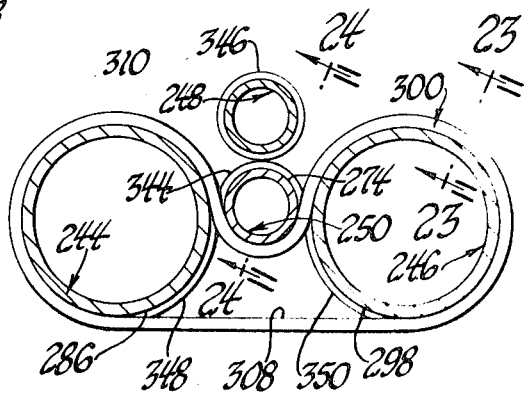

FIG. 27, a cross-sectional view taken generally on the plane of line 27–27 of FIG. 25, illustrates the placement of a second main load belt 306. The innermost side 308 and the outermost side 310 of the belt 306 are passed about the elements in the same manner as the first main load belt 300, previously described, except that the main load belt 306 is received in and follows the second set of load belt grooves comprised of circumferential grooves 286 and 298 of surface drive wheels 244 and 246, respectively, and groove 274 of reaction idler roller 250. The respective directions of rotation as discussed with reference to FIG. 26 apply equally well to the arrangement of FIG. 27.

FIGS. 26 and 27 illustrate the manner of application and the path of travel of the main load belts 300 and 306; however, from an inspection of such Figures it can be seen that inherently the main load belts 300 and 306 do not prevent the main load hub or input roller 248 from, in effect, falling or moving downwardly from its position atop reaction roller 250. This is accomplished, in this embodiment, by a separate set of snubbing or tensioning type belts which are separately illustrated in FIGS. 28, 29, 30 and 31.

FIG. 28, a cross-sectional view taken generally on the plane of line 28–28 of FIG. 25, illustrates a first endless constraining belt 312 received generally about and within groove 290 of drive wheel 246. The belt 312 is also looped about the power input member in a manner as to have the innermost side 314 thereof received within the groove 254; the belt continues by being passed between members 248 and 250 in a manner whereby the belt is wrapped partially about roller 250 thereby causing the outermost side 316 thereof to be received within groove 266 of idler 250. The belt 312, by passing between idler 250 and drive wheel 246, continues its circuitous path within groove 290 of wheel 246.

Figure 29:
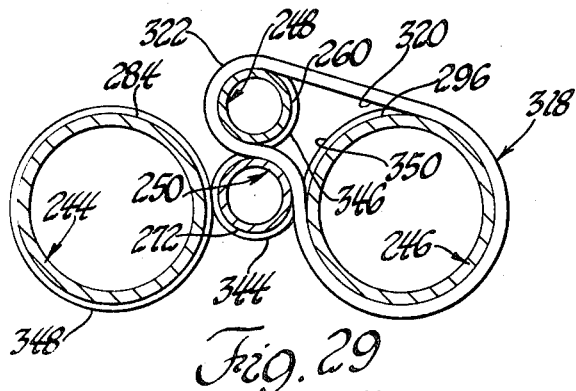

FIG. 29, a cross-sectional view taken generally on the plane of line 29–29 of FIG. 25, illustrates the placement of a second endless constraining belt 318. The innermost side 320 and the outermost side 322 of belt 318 are passed around and between rollers 248, 250 and wheel 246 in the same general manner as the first snubbing belt 312, previously described, except that the second belt 318 is received in and follows a second set of constraining belt grooves comprised of circumferential grooves 260 and 272 of power input member 248 and idler roller 250, respectively.

Figure 30:
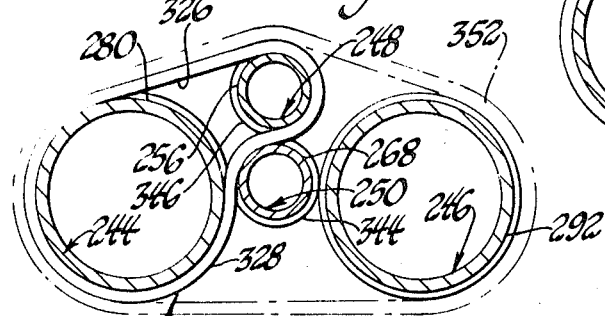

FIG. 30, a cross-sectional view taken generally on the plane of line 30–30 of FIG. 25, illustrates a third endless constraining belt 324 received generally about and within groove 280 of drive wheel 244. The belt 324 is also looped about the power input member 248 in a manner as to have the innermost side 326 thereof received within the groove 256; the belt continues by being passed between members 248 and 250 in a manner whereby the belt is wrapped partially about roller 250 thereby causing the outermost side 328 thereof to be received within groove 268 of idler 250. The belt 324, by passing between idler 250 and drive wheel 244, continues its circuitous path within groove 280 of wheel 244.

Figure 31:
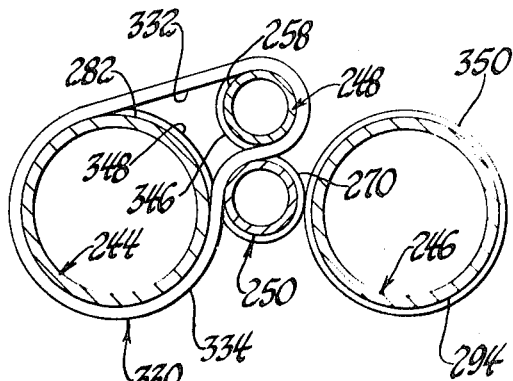

FIG. 31, a cross-sectional view taken generally on the plane of line 31–31 of FIG. 25, illustrates the placement of a fourth endless constraining belt 330. The innermost side 332 and the outermost side 334 of belt 330 are passed around and between rollers 248, 250 and wheel 244 in the same general manner as the third snubbing belt 324, previously described, except that the belt 330 is received in and follows a fourth set of constraining belt grooves comprised of circumferential grooves 258 and 270 of power input member 248 and idler roller 250, respectively, and wheel groove 294.

Figure 32:
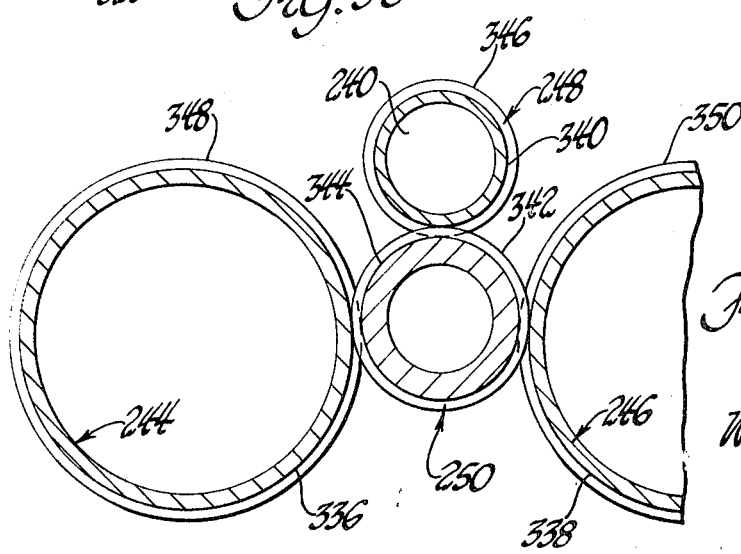
FIG. 32 is a fragmentary cross-sectional view taken on the plane of line 32–32 of FIG. 25 and looking in the direction of the arrows.

FIG. 32, a fragmentary cross-sectional view taken generally on the plane of line 32–32 of FIG. 25, illustrates the self-tracting arrangement as being comprised of a plurality of circumferentially extending tracking grooves 336, 338 and 340 respectively formed in drive wheels 244, 246 and power input member 248 and a cooperating circumferentially extending tracking grooves 336, 338 and 340 respectively formed in drive wheels 244, 246 and power input member 248 and a cooperating circumferentially extending tracking flange 342 formed on reaction roller 250 and directed radially outwardly beyond the outer diameter 344 thereof. As shown in FIG. 25, each of said tracking grooves and said tracking flange are located so as to be medially disposed between the ends of the respective elements.

In comparing FIGS. 28, 29 to FIGS. 30, 31, it can be seen that the constraining belts 312 and 318 provide a restrictive force against the power input roller 248 which is in opposition to the restrictive force developed by belts 324 and 330. Accordingly, by virtue of such balanced oppositely directed restrictive forces, the power input roller 248 is maintained substantially in the position illustrated while simultaneously maintaining rolling driving contact with the reaction roller 250. Consequently, as shown in FIG. 32, the disclosed system of belts enables the outer diameter 346 of power input roller 248 to be held in rolling contact with the outer diameter 344 of reaction roller 250. Simultaneously, the belts enable a rolling contact to be achieved as between the outer diameter 344 of reaction idler roller 250 and the outer diameters 348 and 350 of drive wheels 244 and 246, respectively.

The various belts are preferrably of V-type cross section and to that extent if cross-sectional views were taken as, for example, at lines 23–23 and 24–24 of FIG. 27, views such as shown in FIGS. 23 and 24 would be obtained.

Further, as in the embodiment of FIG. 1, each of the other embodiments may also be provided with a tread belt 352 which is looped about the driving wheels and the primary power input roller.

In view of the preceding, it can be seen that in each of the three embodiments of the invention means are provided whereby a conventional on-road type vehicle such as the truck 10 can be quickly modified for use on either off-road terrain or even on unsurfaced roads where greater traction and load carrying capacity is required merely by removing the conventional tired wheels from the driving axle and replacing such conventional wheels with the integrated load-suspension and surface locomotion apparatus disclosed herein.

It should be noted that in order to make such an adaptive wheeled traction device useable in combination with otherwise conventional vehicles such traction devices would have to be of the type which can be easily secured to or mounted on the vehicle and which further includes means whereby the direction of propelling motion of the traction device is consistent with the conventional gearing and transmission means contained by such conventional vehicles. For example, when the vehicle operator selects a particular forward speed gear, the traction device should result in forward motion and not cause a reverse motion to the vehicle.

Accordingly, it can be seen that in each of the embodiments disclosed various forms of idler means are provided for effectively causing a reversal of rotation direction between, for example, the vehicle drive axle shaft and the surface engaging wheels as 22 and 24.

The application of the invention is by no means limited for use in combination with truck-type vehicles. It is conceivable that the invention can be equally well employed in combination with, for example, farming-type tractors of a rather low capacity in order to further increase the capability of the tractors in terms of riding atop the surface of the ground as well as increasing its tractive force. Of course, many more possibilities will become evident to those skilled in the art.

Although only three selected embodiments of the invention have been disclosed and described, it is apparent that other embodiments and modifications of the invention are possible within the scope of the appended claims.

I claim:

1. An adaptive wheeled load-suspension and surface locomotion device for use with an associated vehicle, comprising at least first and second spaced surface locomotion wheels, a rotatable power input member adapted for driving connection to a power supplying shaft of an associated vehicle, endless belt means circumferentially engaging said spaced surface locomotion wheels and engaging said rotatable power input member, and reversing idler means operatively generally peripherally engaging said rotatable power input member and said spaced surface locomotion wheels, said idler means including an idler axis of rotation situated as to be normally at a height between the lowest-most and highest-most portions of said first and second surface locomotion wheels, said idler means being effective for causing rotation of said spaced surface locomotion wheels in the same direction as the rotation of said rotatable power input member, said endless belt means being disposed to circumferentially apply to said first and second surface locomotion wheels a first loading force generally radially directed with respect to said surface locomotion wheels of a magnitude reflective of the magnitude of the weight load of said vehicle, and said endless belt means being further disposed and effective under all operating conditions for continuously generally drawing said idler means said power input member and said first and second surface locomotion wheels toward each other for maintaining said idler means said power input member and said first and second surface locomotion wheels in operative rolling engagement with respect to each other such as whenever said vehicle weight load is removed from said rotatable power input member as when upward acceleration is imparted to said associated vehicle.

2. An adaptive wheeled load suspension and surface locomotion device according to claim 1, wherein said endless belt means comprises flexible constraining means peripherally engaging and constraining said first and second surface locomotion wheels said power input member and said reversing idler means.

3. An adaptive wheeled load suspension and surface locomotion device according to claim 2 including an endless surface-traversing element operatively engaging and carried by said first and second spaced surface locomotion wheels, said surface-traversing element being effective for applying a continuous surface-engaging track between said surface and said spaced surface locomotion wheels.

4. An adaptive wheeled load suspension and surface locomotion device according to claim 1 wherein said power input member comprises a first friction drive roller, and wherein said reversing idler means comprises a second friction drive roller.

5. An adaptive wheeled load suspension and surface locomotion device according to claim 1 wherein said endless belt means comprises endless load belt means operatively engaging and circumscribing a major portion of the circumference of each of said first and second surface locomotion wheels, said load belt means including upper and lower run portions generally spanning the distance between said first and second spaced surface locomotion wheels, said rotatable power input member operatively engaging said upper run portion and said reversing idler means operatively engaging said lower run portion, and additional constraining means operatively engaging said upper run portion and said reversing idler means for causing said rotatable power input member to be urged into driving engagement with said upper run portion.

6. An adaptive wheeled load suspension and surface locomotion device according to claim 1 wherein said endless belt means comprises endless load belt means operatively engaging and circumscribing a major portion of the circumference of each of said first and second spaced surface locomotion wheels, said load belt means including upper and lower run portions generally spanning the distance between said first and second spaced surface locomotion wheels, said rotatable power input member operatively engaging said upper run portion and said reversing idler means operatively engaging said lower run portion, and additional constraining means operatively engaging said upper run portion and said reversing idler means for simultaneously causing said rotatable power input member to be urged into driving engagement with said upper run portion and causing said reversing idler means to be urged into driving engagement with said lower run portion.

7. An adaptive wheeled load suspension and surface locomotion device according to claim 6 wherein said additional constraining means comprises a first rotatable idler member situated above said upper run portion generally between said rotatable power input member and said first surface locomotion wheel, a second rotatable idler member situated above said upper run portion generally between said rotatable power input member and said second surface locomotion wheel, endless constraining belt means generally encircling said first and second rotatable idler members and said reversing idler means, said endless constraining belt means being effective for yieldingly urging said first and second rotatable idler members and said reversing idler means generally toward each other and against said endless load belt means.

8. An adaptive wheeled load suspension and surface locomotion device according to claim 7 wherein said reversing idler means comprises a third rotatable idler member, and wherein said constraining belt means comprises at least a first endless constraining belt looped about said first rotatable idler member and said third rotatable idler member, and a second endless constraining belt looped about said second rotatable idler member and said third rotatable idler member.

9. An adaptive wheeled load suspension and surface locomotion device according to claim 8 wherein said first endless constraining belt is looped about said first and third rotatable idler members and also passes between said first surface locomotion wheel and said rotatable power input member.

10. An adaptive wheeled load suspension and surface locomotion device according to claim 8 wherein said second endless constraining belt is looped about said second and third rotatable idler members and also passes between said second surface locomotion wheel and said rotatable power input member.

11. An adaptive wheeled load suspension and surface locomotion device according to claim 8 wherein said first endless constraining belt is looped about said first and third rotatable idler members and also passes between and engages said first surface locomotion wheel and said rotatable power input member, and wherein said second endless constraining belt is looped about said second and third rotatable idler members and also passes between and engages said second surface locomotion wheel and said rotatable power input member.

12. An adaptive wheeled load suspension and surface locomotion device according to claim 1 wherein said endless belt means operatively engages and circumscribes a major portion of the circumference of each of said first and second spaced surface locomotion wheels, said belt means including upper and lower run portions generally spanning the distance between said first and second spaced locomotion wheels, wherein said rotatable power input member comprises an input roller operatively engaging said upper run portion at the underside thereof, wherein said reversing idler means comprises a first reaction idler roller rollingly engaging said input roller and said first and second surface locomotion wheels, said reaction idler roller operatively engaging said lower run portion at the underside thereof, and additional constraining means operatively engaging said upper run portion and said first reaction idler roller for causing said input roller to be urged into driving engagement with said upper run, said additional constraining means comprising a first upper idler roller situated generally between and in rolling engagement with said first surface locomotion wheel and said input roller, said first upper idler roller also being disposed above and in rolling contact with said upper run of said endless belt means, a second upper idler roller situated generally between and in rolling engagement with said second surface locomotion wheel and said input roller, said second idler roller also being disposed above and in rolling contact with said upper run of said endless belt means, a first endless constraining belt looped about said first upper idler roller and said reaction idler roller, said first endless constraining belt being so looped as to pass between and in rolling contact with said first surface locomotion wheel and said input roller, and a second endless constraining belt looped about said second upper idler roller and said reaction idler roller, said second endless constraining belt being so looped as to pass between and in rolling contact with said second surface locomotion wheel and said input roller.

13. An adaptive wheeled load suspension and surface locomotion device according to claim 12 wherein a plurality of separate load belts comprise said endless belt means, including third and fourth constraining belts, said third constraining belt being situated identically to said first constraining belt but spaced therefrom and said fourth constraining belt being situated identically to said second constraining belt but spaced therefrom.

14. An adaptive wheeled load suspension and surface locomotion device according to claim 1 wherein said endless belt means circumferentially engaging said spaced surface locomotion wheels comprises at least first and second endless load belts, said first load belt including a first upper run portion generally spanning the distance between said first and second surface locomotion wheels, said second load belt including a second upper run portion generally spanning the distance between said first and second surface locomotion wheels, said first upper run portion of said first belt being passed under and about said idler means and upwardly between said idler means and said second surface locomotion wheel and then between said power input member and said idler means, said first upper run portion continuing in rolling contact about one side and over the top of said power input member then continuing about said second surface locomotion wheel, and said second upper run portion of said second belt being passed under and about said idler means and upwardly between said idler means and said first surface locomotion wheel and then between said power input member and said idler means, said second upper run portion continuing in rolling contact about an other side and over the top of said power input member and then continuing about said first surface locomotion wheel.

15. An adaptive wheeled load suspension and surface locomotion device according to claim 14 including at least a pair of said first endless load belts.

16. An adaptive wheeled load suspension and surface locomotion device according to claim 14 wherein said power input member comprises a cylindrical roller, and wherein said idler means comprises a second cylindrical roller situated generally between said spaced first and second surface locomotion wheels and held in rolling contact therewith.

17. An adaptive wheeled load suspension and surface locomotion device according to claim 1 wherein said endless belt means includes upper and lower run portions generally spanning the distance between said first and second spaced surface locomotion wheels, said reversing idler means operatively engaging said upper run portion, and additional constraining means operatively engaging said power input member and each of said first and second spaced surface locomotion wheels, said constraining means being effective for yieldingly urging said idler means against said upper run portion.

18. An adaptive wheeled load suspension and surface locomotion device according to claim 17 wherein said additional constraining means comprises at least a first endless constraining belt looped about said first surface locomotion wheel and said power input member, and at least a second endless constraining belt looped about said second surface locomotion wheel and said power input member.

19. An adaptive wheeled load suspension and surface locomotion device according to claim 18 wherein each of said constraining belts includes at least one run portion between said power input member and said idler means for rollingly engaging opposite sides of said idler means.